US008058855B2

United States Patent
Cheng (10) Patent No.: US 8,058,855 B2
(45) Date of Patent: Nov. 15, 2011

(54) DIRECT CURRENT CONVERTER

(75) Inventor: Chieh-Wen Cheng, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 377 days.

(21) Appl. No.: 12/499,805

(22) Filed: Jul. 9, 2009

(65) Prior Publication Data
US 2010/0259233 A1    Oct. 14, 2010

(30) Foreign Application Priority Data

Apr. 13, 2009  (TW) ............................... 98112179 A (51) Int. Cl.
*G05F 1/40* (2006.01)
(52) U.S. Cl. ........................................ 323/271; 323/285
(58) Field of Classification Search .................. 323/222, 323/225, 268, 271, 282, 285, 288
See application file for complete search history.

(56) References Cited

U.S. PATENT DOCUMENTS

| 5,627,460 | A  | * | 5/1997  | Bazinet et al. | ................. 323/288 |
| 7,321,258 | B2 | * | 1/2008  | Wong et al. | .................... 327/589 |
| 7,368,957 | B2 | * | 5/2008  | Clarkin et al. | ................. 327/110 |
| 7,609,036 | B2 | * | 10/2009 | Bartolo et al. | ................. 323/224 |
| 2011/0156669 | A1 | * | 6/2011 | Ishii | ............................. 323/271 |

* cited by examiner

*Primary Examiner* — Matthew Nguyen
(74) *Attorney, Agent, or Firm* — Winston Hsu; Scott Margo (57) ABSTRACT

A direct current converter includes a first node, a second node, an input voltage terminal, an output voltage terminal, a bootstrap source terminal, a low-voltage terminal, a control module for generating a control signal, a driving-stage circuit coupled to the input voltage terminal, the first node, the second node, the control module, and the low-voltage terminal, an output-stage circuit coupled to the second node and the output voltage terminal, and a bootstrap circuit including a capacitor coupled between the first node and the second node, a fault detector for outputting a switch signal, and a cascade unit coupled to the bootstrap source terminal, the first node, the control module, and the fault detector for controlling connection between the bootstrap source terminal and the first node according to the switch signal and the control signal.

22 Claims, 8 Drawing Sheets

DIRECT CURRENT CONVERTER

BACKGROUND OF THE INVENTION

1. Field of the Invention

The present invention is related to a direct current converter, and more particularly, to a direct current converter capable of preventing body diodes from conducting and accurately detecting operation faults.

2. Description of the Prior Art

An electronic device includes various components, each of which may operate in a different voltage level. Therefore, a DC-DC (direct current to direct current) voltage converter is definitely required to adjust (step up or down) and stabilize the voltage level in the electronic device. Originating from a buck (or step down) converter and a boost (or step up) converter, various types of DC-DC voltage converters are accordingly customized to meet different power requirements. As implied by the names, the buck converter is utilized for stepping down a DC voltage of an input terminal to a default voltage level, and the boost converter is for stepping up the DC voltage of the input terminal. With the advancement of modern electronics technology, both of the buck converter and the boost converter are modified and customized to conform to different architectures or to meet different requirements.

Figure 1:
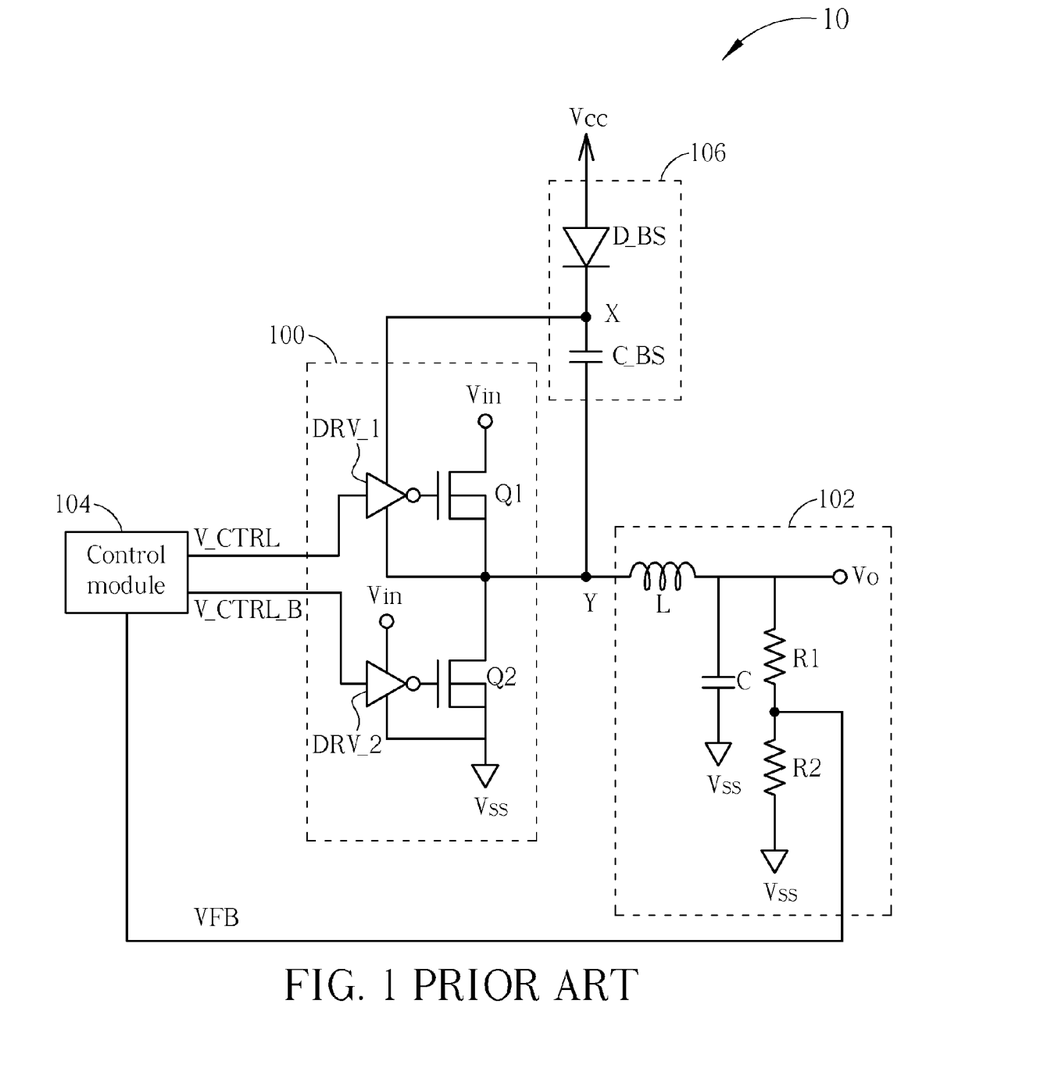
FIG. 1 is a schematic diagram of a bootstrap buck converter of the prior art.

For example, please refer to FIG. 1, which is a schematic diagram of a bootstrap buck converter 10 of the prior art. The bootstrap buck converter 10 comprises a driving-stage circuit 100, an output-stage circuit 102, a control module 104 and a bootstrap circuit 106. In the bootstrap buck converter 10, an input terminal provides a fixed voltage Vin. By using the control module 104 and the bootstrap circuit 106 generate control signals to the driving-stage circuit 100, in order to exchange energy via an inductor in the output-stage circuit 102, so as to acquire a stable DC voltage source Vo with a magnitude less than the voltage Vin of the input terminal. The driving-stage circuit 100 comprises power transistors Q1, Q2 and driving units DRV_1, DRV_2. Through the driving units DRV_1, DRV_2 and the bootstrap circuit 106, the bootstrap buck converter 10 can controls the power transistors Q1, Q2 according to control signals V_CTRL, V_CTRL_B generated by the control module 104, and output a switching signal from a node Y to the output-stage circuit 102. The output-stage circuit 102 comprises an inductor L, a capacitor C and feedback resistors R1, R2. Via the inductor L, the switching signal of the node Y can exchange energy with the output terminal Vo, and the capacitor C can stabilize the voltage of the output terminal Vo and alleviate voltage variations at the output terminal. The voltage of the output terminal Vo can feedback a voltage VFB through the feedback resistors R1, R2, such that the control module 104 can accordingly generate the control signals V_CTRL, V_CTRL_B. The bootstrap circuit 106 comprises a bootstrap capacitor C_BS and a diode D_BS. Operations of the bootstrap buck converter 10 are well known to those skilled in the art, i.e. the control module 104 and the bootstrap circuit 106 generate driving signals to enable the power transistor Q1 and disable the power transistor Q2, or swap over, so as to keep the inductor L operating between a charge status and a discharge status. In such a situation, through the control signal V_CTRL, the control module 104 can adjust a switching frequency between the charge status and the discharge status according to the feedback signal VFB generated by the feedback resistors R1, R2, to generate the desired output voltage Vo.

In the bootstrap buck converter 10, preferably, the driving units DRV_1, DRV_2 are inverters, driven by node voltages V_X, V_Y of nodes X and Y, the input voltage Vin and a low-potential voltage Vss. The node X is located between the bootstrap capacitor C_BS and the diode D_BS, and the node Y is located among the driving-stage circuit 100, the output-stage circuit 102 and the bootstrap circuit 106. When the power transistor Q2 is enabled, the node voltage V_Y approaches the low-potential voltage Vss, and a bootstrap voltage Vcc charges the bootstrap capacitor C_BS via the diode D_BS. On the contrary, when the power transistor Q2 is disabled, the node voltage V_Y transiently increases to approach the input voltage Vin. Meanwhile, since energy stored in the bootstrap capacitor C_BS is not exhausted, the node voltage V_X would increase to a magnitude equal to the node voltage V_Y plus the bootstrap source terminal voltage Vcc, great enough to activate the driving unit DRV_1. Thus, when the bootstrap buck converter 10 switches from the mode "Q1: disable; Q2: enable" to the mode "Q1: enable; Q2: disable", the bootstrap capacitor C_BS can transiently increase the node voltage V_X by the bootstrap circuit 106, to activate the driving unit DRV_1.

In the prior art, the bootstrap circuit 106 are preferably positioned outside a chip. Taking the voltage bearing ability of the diode D_BS into consideration, manufacturing cost and circuit complexity would accordingly increase. In order to overcome this disadvantage, the prior art has developed an architecture replacing or simulating the diode D_BS of the bootstrap circuit 106 by a metal oxide semiconductor field effect transistor (MOSFET), so as to embed the MOSFET in the chip. Even though the MOSFET functions almost the same as the diode D_BS, in some cases, a leakage current between the node X and the bootstrap voltage terminal probably follows though a parasitical body diode embedded within the MOSFET, and leads to irregularities and poorer efficiency in the bootstrap circuit 106 and thereby a negative influence on the whole functionality of the bootstrap buck converter 10. In addition, in the bootstrap buck converter 10, once the node X may be short-circuit due to component breakdown issues, the external high-voltage terminal (the voltage Vcc) would be pulled low, which negatively affects inner operations of the chip.

Therefore, enhancing the bootstrap circuit in the buck converter has been one of the objectives and the industry is focusing on.

SUMMARY OF THE INVENTION

It is therefore a primary objective of the claimed invention to provide a direct current converter, to overcome disadvantages of the prior art.

The present invention discloses a direct current converter for converting an input voltage to an output voltage. The direct current converter comprises a first node, a second node, an input voltage terminal for receiving the input voltage, an output voltage terminal for outputting the output voltage, a bootstrap source terminal coupled to a high-potential voltage, a low-voltage terminal coupled to a low-potential voltage, a control module for generating a control signal, a driving-stage circuit coupled to the input voltage terminal, the first node, the second node, the control module and the low-voltage terminal for being driven by a voltage of the first node, the input voltage and the low-potential voltage to convert the input voltage to a switching signal and output the switching signal to the second node, an output-stage circuit, coupled to the second node and the output voltage terminal, for converting the switching signal to the desired output voltage Vo, and a bootstrap circuit comprising a bootstrap capacitor coupled between the first node and the second node, a fault detector for outputting a switch signal, and a cascade unit coupled to the bootstrap source terminal, the first node, the control module and the fault detector for controlling a connection between the bootstrap source terminal and the first node according to the switch signal and the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
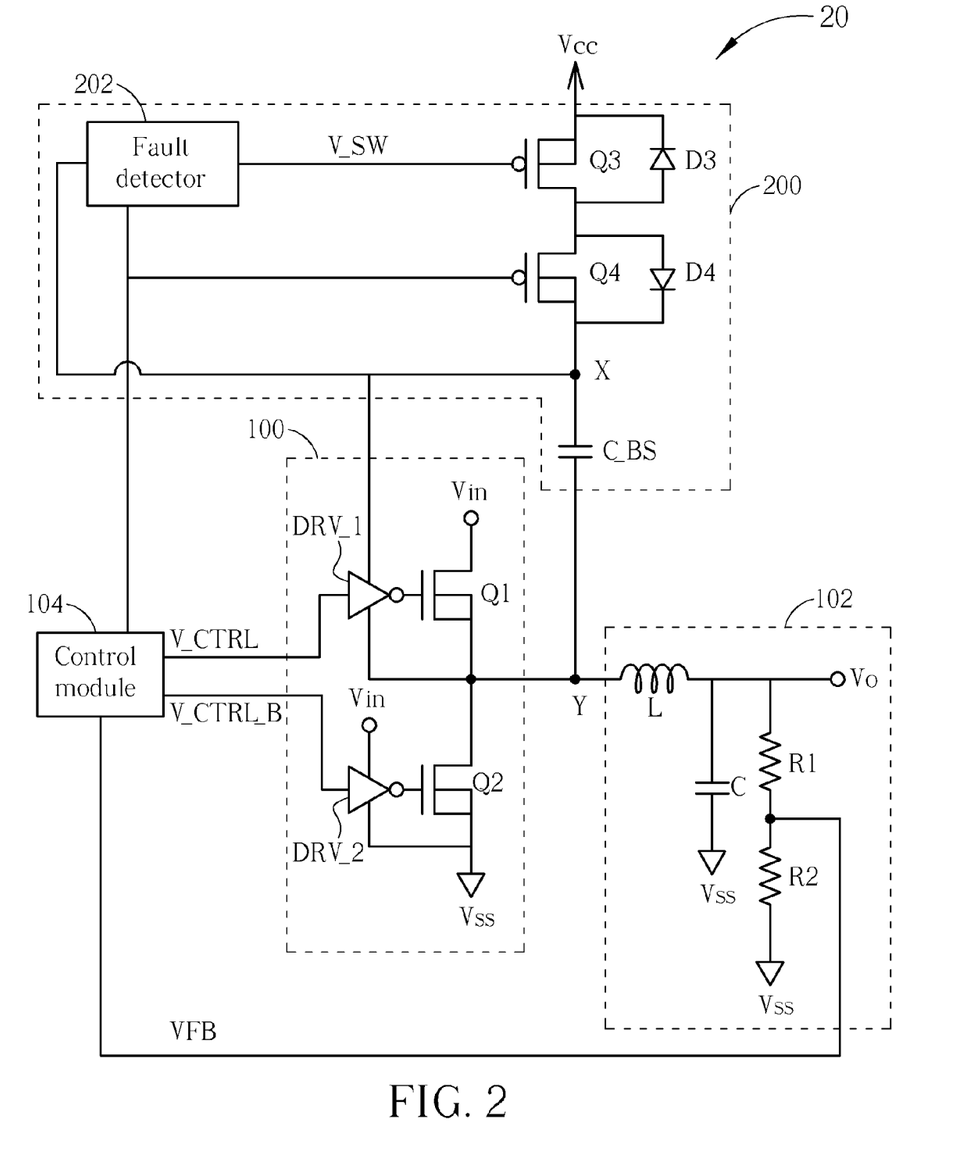
FIG. 2 is a schematic diagram of a direct current converter according to an embodiment of the present invention.

Please refer to FIG. 2, which is a schematic diagram of a direct current converter 20 according to an embodiment of the present invention. The direct current converter 20 is similar to the bootstrap buck converter 10 of FIG. 1 in architecture and operations, and therefore utilizes exactly the same symbols to indicate identical components for the sake of clarity. The direct current converter 20 differs from the bootstrap buck converter 10 in a bootstrap circuit 200 replacing the bootstrap circuit 106 of the bootstrap buck converter 10. In comparison with the bootstrap circuit 106, the bootstrap circuit 200 replaces the diode D_BS by transistors Q3, Q4, and further includes a fault detector 202. As illustrated in FIG. 2, the transistors Q3, Q4 are p-type metal oxide semiconductor field effect transistors (MOSFETs), and drains thereof are mutually coupled to form a "back to back" cascade unit. "Back to back" herein refers to a structure wherein body diodes D3, D4 of the transistors Q3, Q4 are reversely coupled. With the "back to back" structure, the body diodes D3, D4 wouldn't conduct to each other under normal operations, so as to minimize faults in the direct current converter 20. In addition, the fault detector 202 is utilized for immediately detecting whether a fault occurs and outputting a switch signal V_SW, to enable or disable the transistor Q3. Also, the transistor Q4 is controlled by the control signal V_CTRL. That is, the transistors Q3, Q4 are respectively controlled by the switch signal V_SW and the control signal V_CTRL, to timely switch a connection between the high-voltage terminal (the bootstrap voltage Vcc) and the node X.

The bootstrap circuit 200 and the control module 104 are preferably positioned outside a chip. Without proper protection, irregularities of the direct current converter 20 may cause a permanent damage to the chip and thereby a breakdown of the direct current converter 20. Therefore, in the present invention, the fault detector 202 can detect irregularities at the node voltage V_X, and accordingly control the transistor Q3. As a result, even if the node X to the low voltage terminal is short due to component breakdown issues, the fault detector 202 can immediately disable the transistor Q3, to prevent the external bootstrap voltage terminal (the voltage Vcc) from being pulled low, so as to protect the control module 104 and the bootstrap circuit 200. The direct current converter of the present invention not only can provide driving voltages to the driving-stage circuit but include a protection scheme, to disconnect the corresponding system from the bootstrap circuit.

Figure 3A:
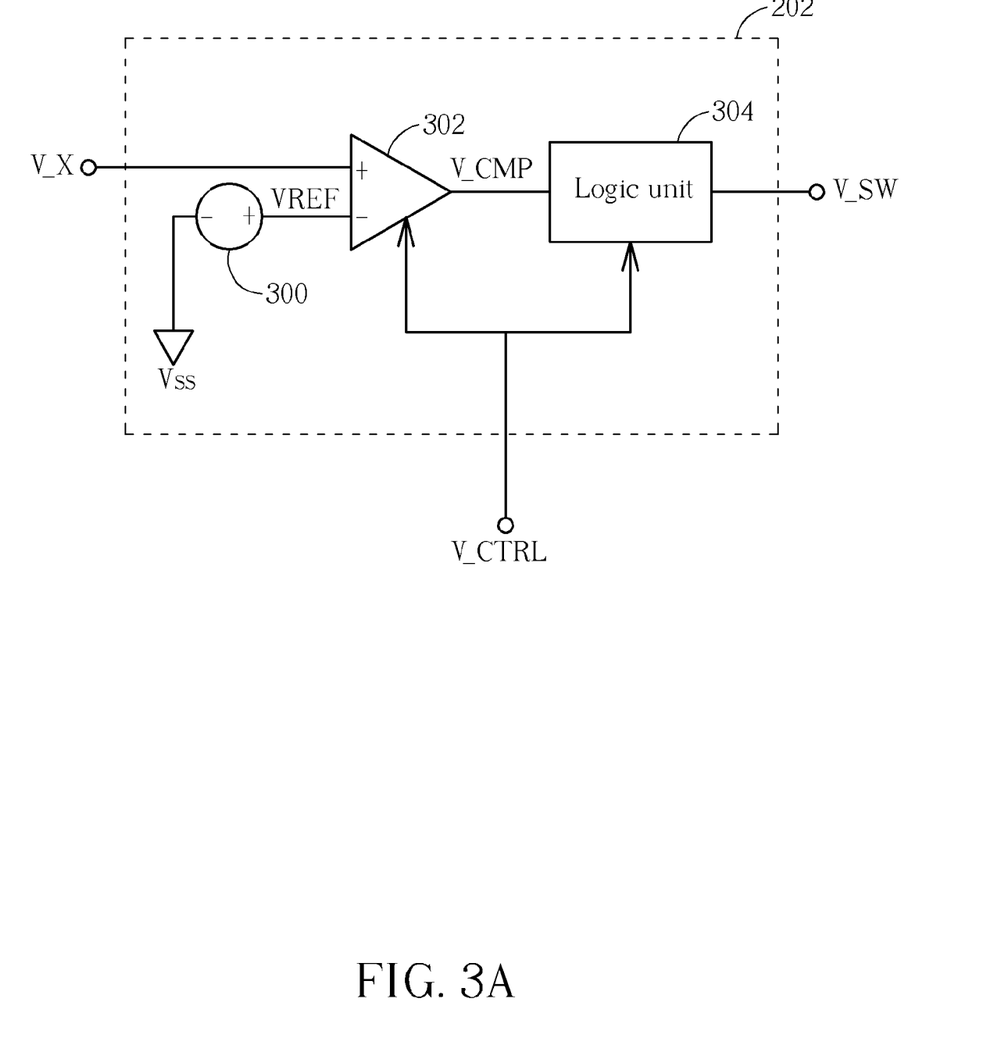
FIG. 3A is a schematic diagram of an embodiment of a fault detector of FIG. 2.

Note that, the direct current converter 20 of FIG. 2 is merely an embodiment of the present invention, and can be accordingly modified and varied by those skilled in the art. For example, please refer to FIG. 3A, which is a schematic diagram of an embodiment of the fault detector 202. In FIG. 3A, the fault detector 202 comprises a reference voltage generator 300, a comparator 302 and a logic unit 304. The reference voltage generator 300 is coupled to a low-voltage terminal (the voltage Vss), and is utilized for generating a reference voltage VREF to the comparator 302. The comparator 302 is coupled to the node X and the reference voltage generator 300, and is utilized for comparing the node voltage V_X and the reference voltage VREF under control of the control signal V_CTRL, to generate a comparison result V_CMP to the logic unit 304. Similarly, the logic unit 304 is controlled by the control signal V_CTRL, and utilized for generating the switch signal V_SW.

Figure 3B:
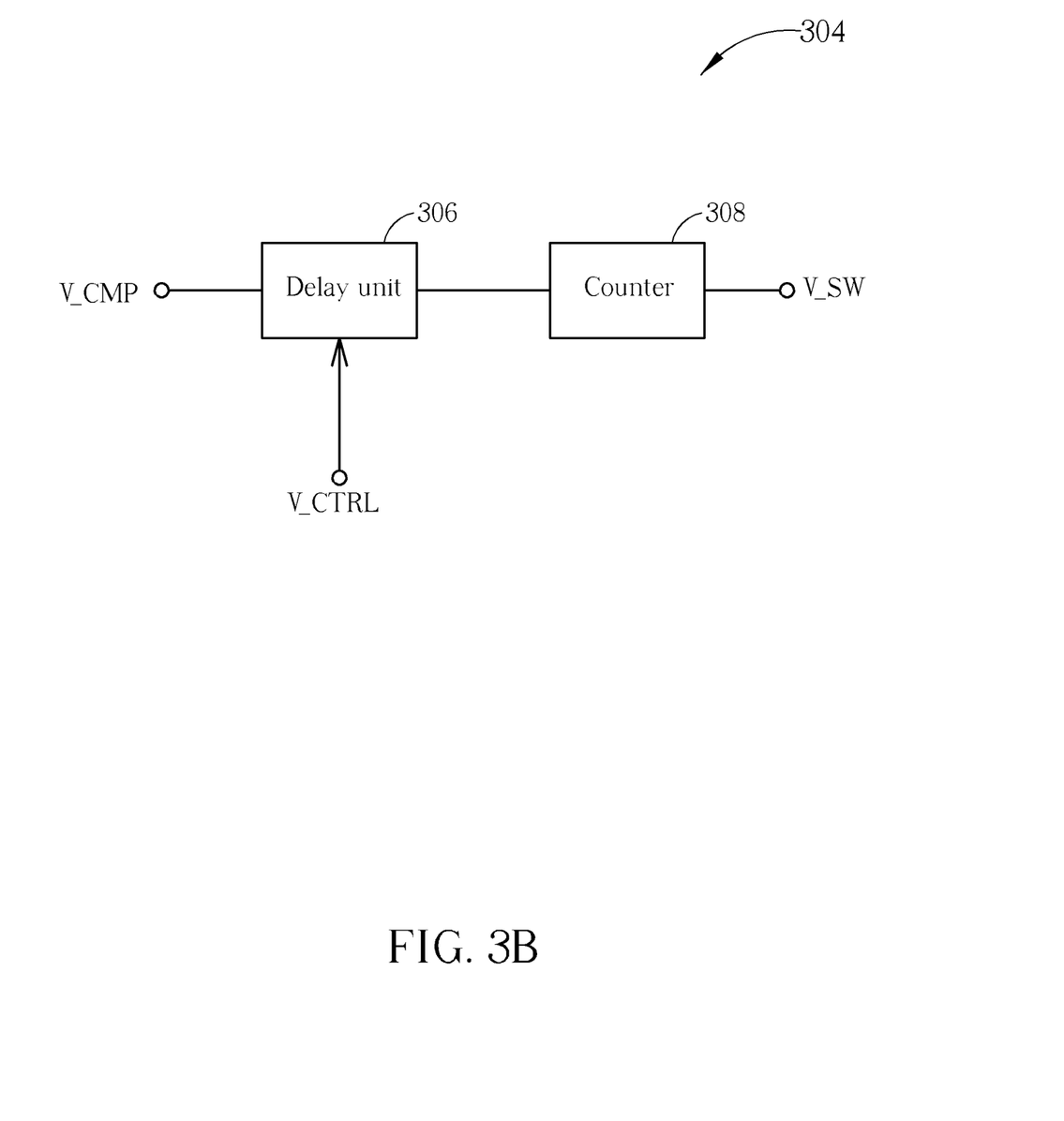
FIG. 3B is a schematic diagram of a logic unit of FIG. 3A.

Please continue to refer to FIG. 3B, which is a schematic diagram of the logic unit 304 of FIG. 3A. The logic unit 304 comprises a delay unit 306 and a counter 308. The delay unit 306 is utilized for delaying the comparison result V_CMP generated by the comparator 302 for a blanking time and then outputting the comparison result V_CMP to the counter 308, to prevent switching noises generated when the direct current converter 20 switches operation statuses from affecting the switch signal V_SW, so as to minimize irregularities in the direct current converter 20. The counter 308 is utilized for counting times that a fault value appears in the comparison result V_CMP, and accordingly outputting the switch signal V_SW. For example, when the node X is short-circuit due to component breakdown issues, the comparison result V_CMP of the comparator 302 would indicate the occurrence of faults, and the counter 308 would count how many times the faults occur. Once a number of the counted times exceeds a default value, the fault detector 202 can disable the transistor Q3 via the switch signal V_SW, to protect the bootstrap circuit 200, so as to stabilize and balance the whole system.

Figure 3C:
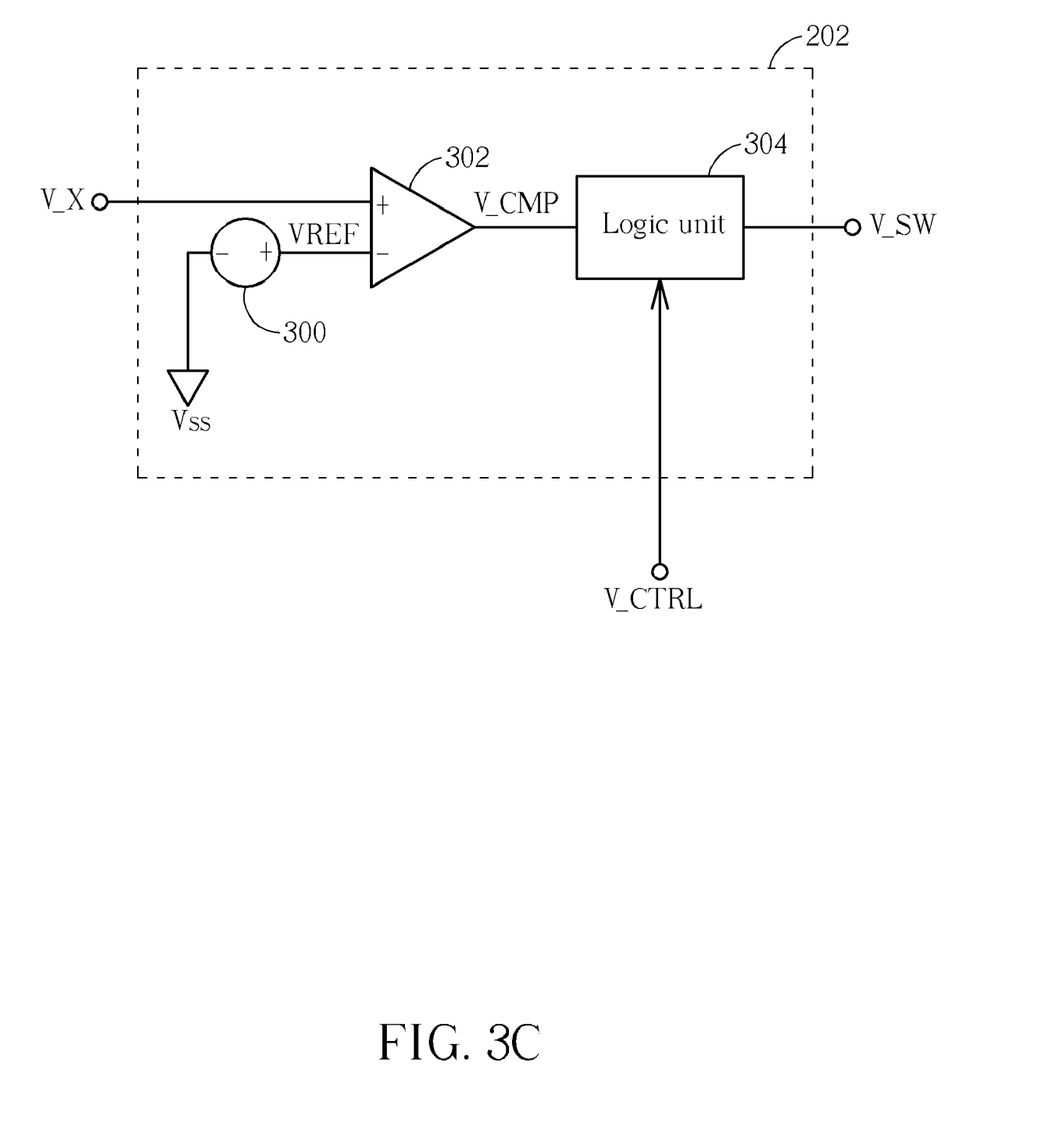
FIG. 3C is a schematic diagram of an alternative embodiment of the fault detector of FIG. 2.

In FIG. 3A, the comparator 302 and the logic unit 304 are both controlled by the control signal V_CTRL. In other words, the comparator 302 and the logic unit 304 operate according to the voltage level of the control signal V_CTRL, to prevent the switching noises from affecting the switch signal V_SW, i.e. the comparator 302 can be activated when the control signal V_CTRL is high or low. In such a situation, the comparator 302 only operates in half time, and therefore the blanking time of the logic unit 304 is acceptable if the blanking time can prevent the comparator 302 from generating irregularities. Certainly, as illustrated in FIG. 3C, the comparator 302 can further operate in full time, i.e. the comparator 302 is no longer controlled by the control signal V_CTRL, but constantly compares the node voltage V_X and the reference voltage VREF. In such a situation, the blanking time of the logic unit 304 has to be greater than a switching period of the control signal V_CTRL. If the node voltage V_X is still greater than the reference voltage VREF during a period which is out of the blanking time, the comparator 302 would keep on outputting the high-potential voltage, such that the fault detector 202 can accordingly determine that there is a fault, and disable the transistor Q3 through the switch signal V_SW. In FIG. 3C, the fault is not determined by the counter 308 but determined according to the blanking time.

Therefore, in the direct current converter 20, the bootstrap circuit 200 can not only provide the electric power required by the driving unit DRV_1, but timely control the transistor Q3, to prevent the external high-voltage terminal from being polled low, so as to stabilize and balance the whole system.

Figure 4A:
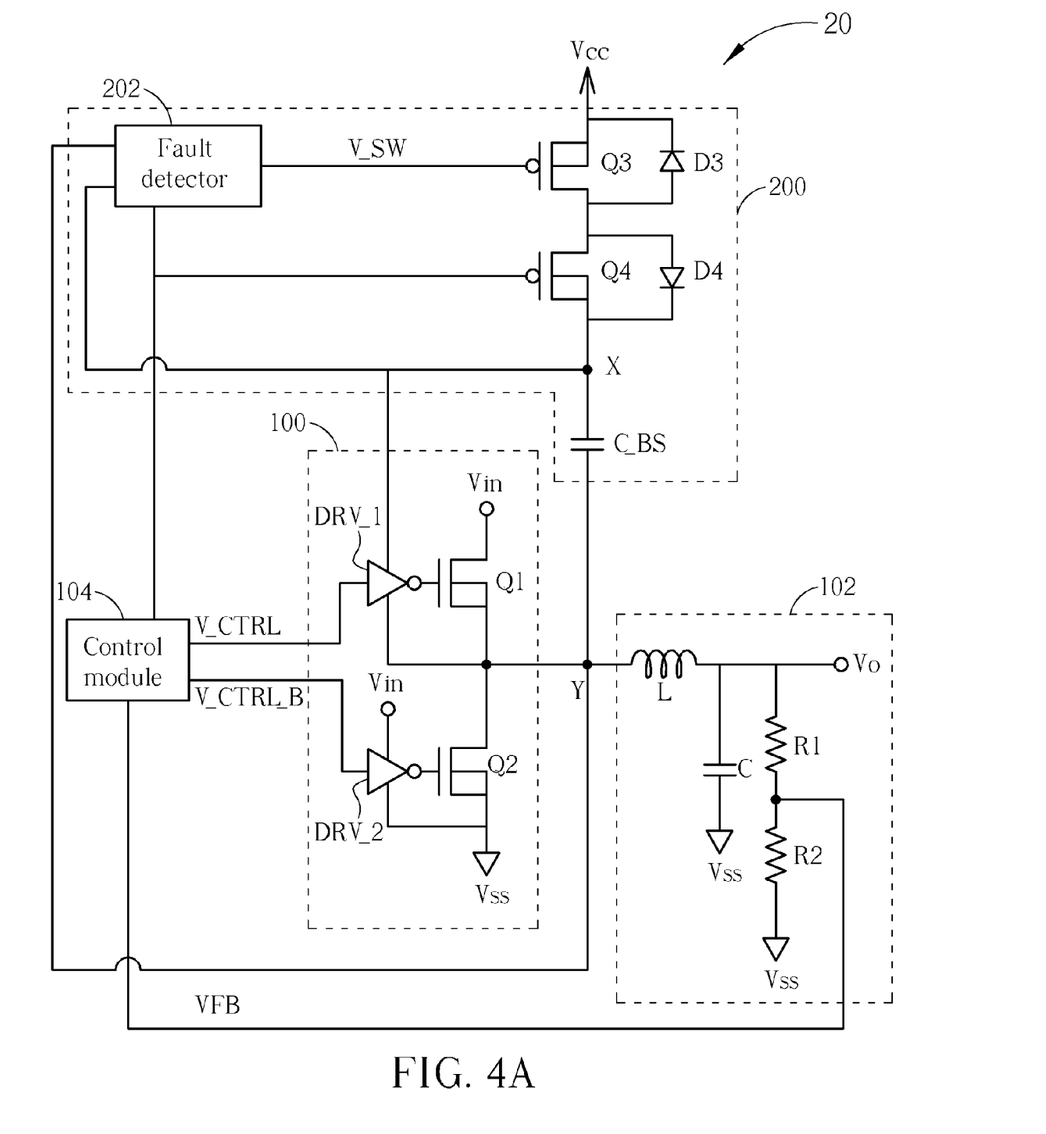
FIG. 4A is a schematic diagram of an alternative embodiment of the direct current converter of FIG. 2.
Figure 4B:
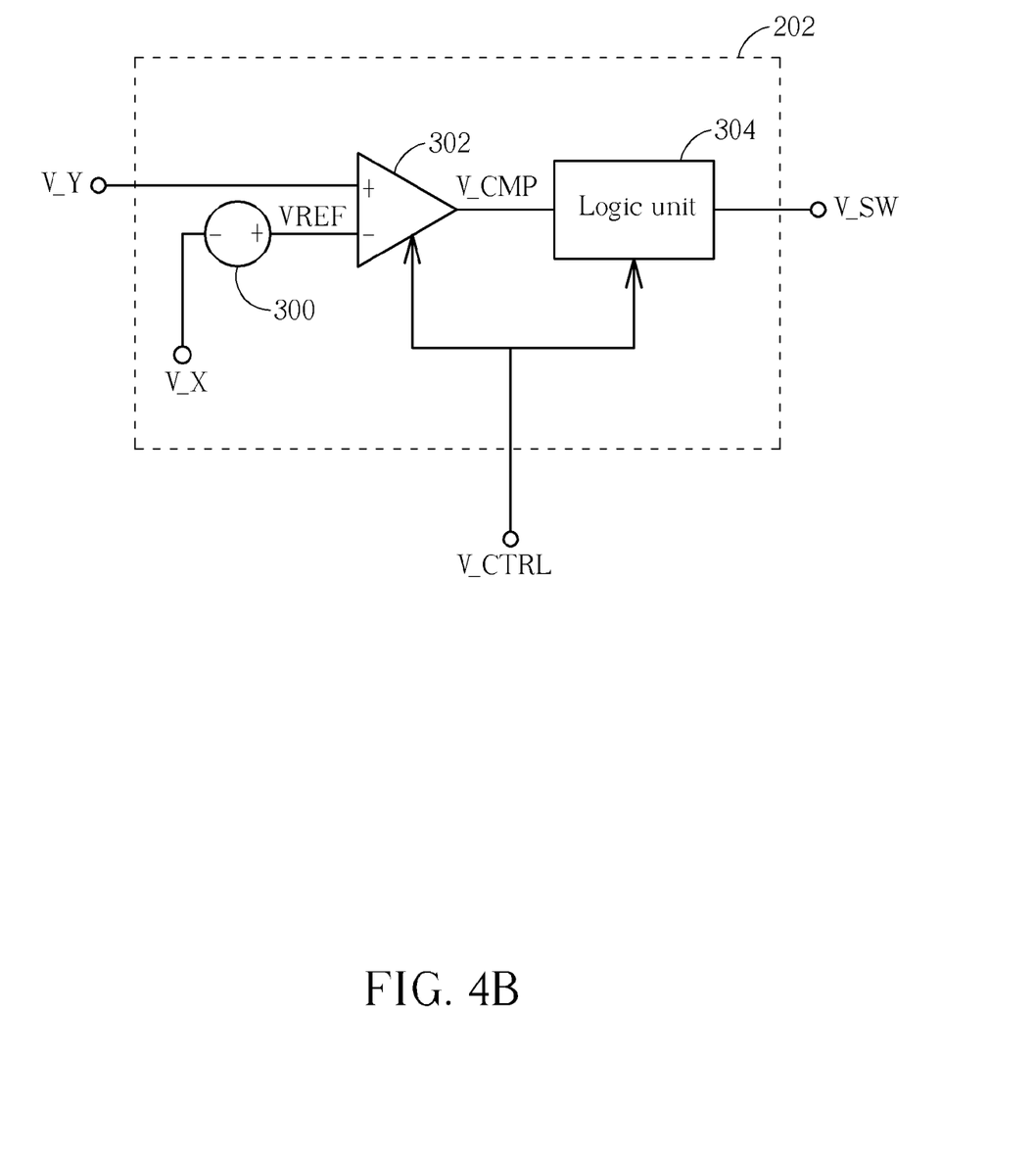
FIG. 4B is a schematic diagram of an alternative embodiment of the fault detector of FIG. 3A.
Figure 4C:
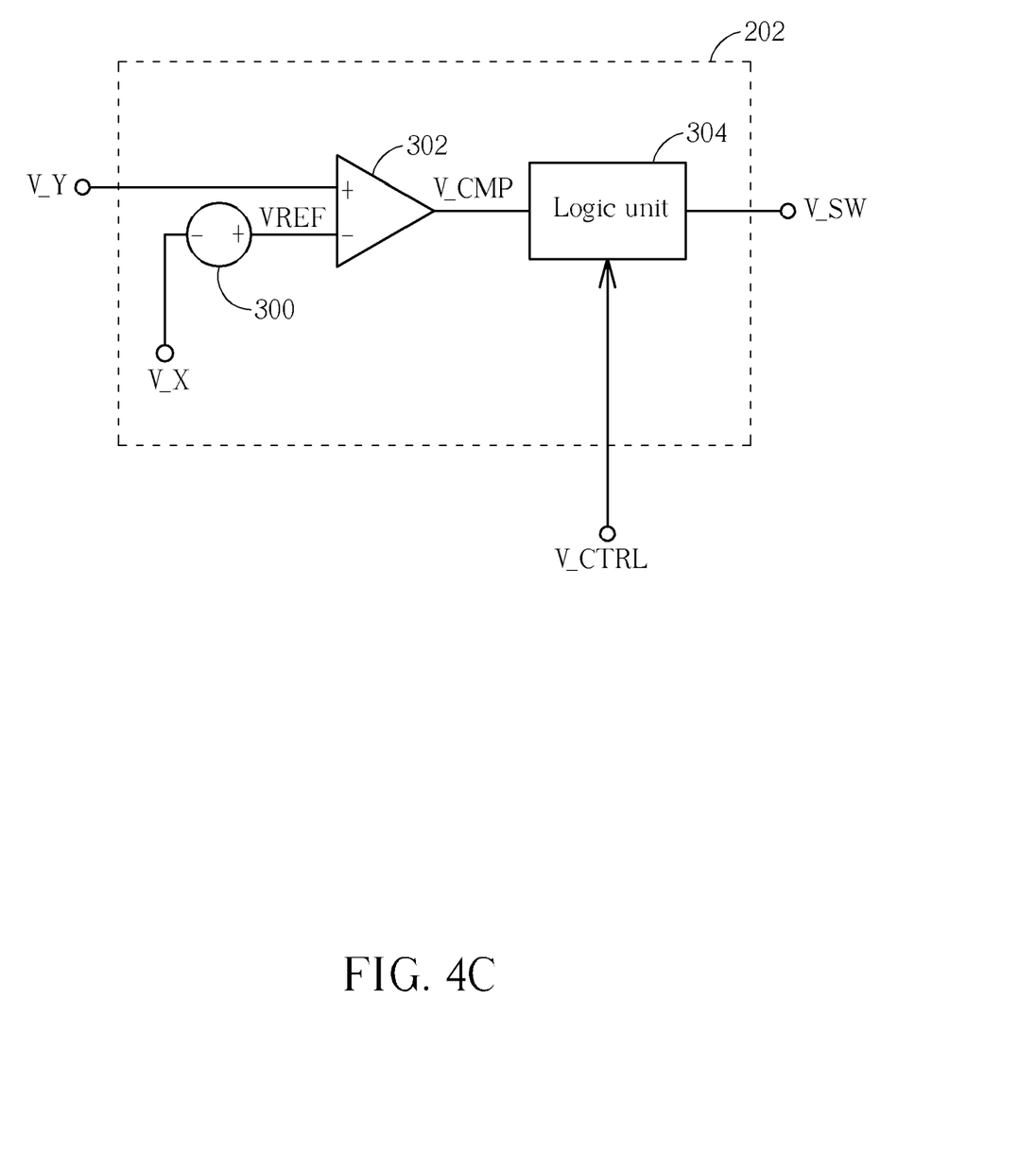
FIG. 4C is a schematic diagram of an alternative embodiment of the fault detector of FIG. 3C.

As described in the above, the direct current converter 20 of FIG. 2 is one embodiment of the present invention, and can be accordingly modified and varied by those skilled in the art. For example, as illustrated in FIG. 4A to FIG. 4C, the fault detector 202 can further determine whether there is a fault according to a cross-voltage of the bootstrap capacitor C_BS, i.e. the node voltage difference V_X–V_Y, to generate the switch signal V_SW. In such a situation, those skilled in the art only have to accordingly modify signal linkage of the fault detector 202. Compare FIG. 4A to FIG. 4C with FIG. 2, FIG. 3A and FIG. 3C for more details.

In the prior art, if the diode D_BS of FIG. 1 is replaced by a metal oxide semiconductor field effect transistor (MOSFET), there will be a diode, namely body diode, parasitizing in the MOSFET. If only one transistor is applied, regardless of a drain or a source of the transistor coupled to the bootstrap voltage terminal, there may be current flowing between the bootstrap voltage terminal and the node X via the body diode when the transistor is disabled, and leading to irregularities in the direct current converter 20. Once the irregularities occur, there may be short-circuit current damaging the bootstrap circuit 200 via the body diode, even worse, affecting the control module 104 negatively. Meanwhile, in the bootstrap buck converter 10, once the node X to the low-voltage terminal is short due to component breakdown issues, the bootstrap source terminal (Vcc) would be pulled low, which leads to a remarkably negative influence on the bootstrap circuit 106. In comparison, the present invention replaces the diode D_BS with the "back to back" transistors Q3, Q4, to ensure that the body diodes D3, D4 would not conduct to each other, so as to minimize faults in the direct current converter 20. Meanwhile, the fault detector 202 can detect irregularities of the node voltage V_X, and accordingly control the transistor Q3. As a result, even if the node X is short-circuit, the fault detector 202 can timely disable the transistor Q3, to prevent the bootstrap source terminal (the voltage Vcc) from being pulled low, to stabilize and balance the whole system. Thus, the present invention can effectively overcome disadvantages of the prior art.

To sum up, the present invention replaces the diode of the bootstrap circuit with the "back to back" transistors to prevent conducting through the body diode of transistors, and includes the schemes of fault detection to prevent the external high-voltage terminal from being pulled low, so as to ensure regularly operations of the whole system.

Those skilled in the art will readily observe that numerous modifications and alterations of the device and method may be made while retaining the teachings of the invention.

What is claimed is:

1. A direct current converter for converting an input voltage to an output voltage comprising:
    a first node;
    a second node;
    an input voltage terminal, for receiving the input voltage;
    an output voltage terminal, for outputting the output voltage;
    a bootstrap source terminal, coupled to a high-potential voltage;
    a low-voltage terminal, coupled to the lowest voltage;
    a control module, for generating a control signal;
    a driving-stage circuit, coupled to the input voltage terminal, the first node, the second node, the control module and the low-voltage terminal, for being driven by a voltage of the first node, the input voltage and the low-potential voltage, to convert the input voltage to a switching signal and output the switching signal to the second node;
    an output-stage circuit, coupled to the second node and the output voltage terminal, for converting the switching signal to the output signal; and
    a bootstrap circuit, comprising:
        a bootstrap capacitor, coupled between the first node and the second node;
        a fault detector, for outputting a switch signal; and
        a cascade unit, coupled to the bootstrap source terminal, the first node, the control module and the fault detector, for controlling a connection between the bootstrap source terminal and the first node according to the switch signal and the control signal.

2. The direct current converter of claim 1, wherein the driving-stage circuit comprises:
    a first power transistor, comprising a first end coupled to the input voltage terminal, a second end, and a third end coupled to the second node, for conducting a connection between the first end and the third end according to a signal of the second end;
    a second power transistor, comprising a first end coupled to the second node, a second end, and a third end coupled to the low-voltage terminal, for conducting a connection between the first end and the third end according to a signal of the second end;
    a first driving unit, comprising a first end coupled to the first node, a second end coupled to the second node, a third end coupled to the control module, and a fourth end coupled to the second end of the first power transistor, for being driven by a difference between the voltage of the first node and a voltage of the second node, to output the control signal to the second end of the first power transistor; and
    a second driving unit, comprising a first end coupled to the input voltage terminal, a second end coupled to the low-voltage terminal, a third end coupled to the control module, and a fourth end coupled to the second end of the second power transistor, for being driven by a difference between the input voltage and the low-potential voltage, to output the control signal to the second end of the second power transistor.

3. The direct current converter of claim 2, wherein the first power transistor is an n-type metal oxide semiconductor field effect transistor, the first end is a drain, the second end is a gate, and the third end is a source.

4. The direct current converter of claim 2, wherein the second power transistor is an n-type metal oxide semiconductor field effect transistor, the first end is a drain, the second end is a gate, and the third end is a source.

5. The direct current converter of claim 2, wherein the first driving unit is an inverter, for inverting the control signal and outputting the inverted control signal to the second end to the first power transistor.

6. The direct current converter of claim 2, wherein the second driving unit is an inverter, for inverting the control signal and outputting the inverted control signal to the second end to the second power transistor.

7. The direct current converter of claim 1, wherein the output-stage circuit comprises:

an inductor, coupled between the second node and the output voltage terminal; and a capacitor, comprising one end coupled the output voltage terminal, and another end coupled to the low-voltage terminal.

8. The direct current converter of claim 7, wherein the output-stage circuit further comprises:

a first resistor, coupled between the output voltage terminal and the control module; and a second resistor, coupled between the control module and the low-voltage terminal.

9. The direct current converter of claim 7, wherein the control module is further utilized for adjusting the control signal according to a dividing voltage generated by the first resistor and the second resistor.

10. The direct current converter of claim 1, wherein the cascade unit comprises:

a first transistor, comprising a first end coupled to the bootstrap source terminal, a second end coupled to the fault detector, and a third end, for controlling a connection between the first end and the third end according to the switch signal received by the second end; and a second transistor, comprising a first end coupled to the first node, a second end coupled to the control module, and a third coupled to the third end of the first transistor, for controlling a connection between the first end and the third end according to the control signal received by the second end.

11. The direct current converter of claim 10, wherein the first transistor is a p-type metal oxide semiconductor field effect transistor, the first end is a source, the second end is a gate, and the third end is a drain.

12. The direct current converter of claim 10, wherein the second transistor is a p-type metal oxide semiconductor field effect transistor, the first end is a source, the second end is a gate, and the third end is a drain.

13. The direct current converter of claim 1, wherein the fault detector outputs the switch signal according to the control signal, the voltage of the first node and the low-potential voltage, and comprises:

a reference voltage generator, coupled to the low-voltage terminal, for generating a reference voltage according to a low-voltage terminal;

a comparator, coupled to the first node and the reference voltage generator, for comparing the voltage of the first node and the reference voltage, to generate a comparison result; and a logic unit, coupled to the control module and the comparator, for generating the switch signal according to the control signal and the comparison result.

14. The direct current converter of claim 13, wherein the comparator is further coupled to the control module, and is utilized for activating comparison between the voltage of the first node and the reference voltage according to the control signal, to generate the comparison result.

15. The direct current converter of claim 13, wherein the logic unit comprises a delay unit, for preventing noises of the switching signal from affecting the switch signal.

16. The direct current converter of claim 13, wherein the delay unit is utilized for generating a delay signal with a blanking time absolutely greater than a period of the control signal, to determine whether the direct current regularly operates.

17. The direct current converter of claim 13, wherein the logic unit further comprises a counter, for counting times that a fault value appears in the comparison result.

18. The direct current converter of claim 1, wherein the fault detector outputs the switch signal according to the control signal, the voltage of the first node and the voltage of the second node, and comprises:

a reference voltage generator, coupled to the first node, for generating a reference voltage according to the voltage of the first node;

a comparator, coupled to the second node and the reference voltage generator, for comparing the voltage of the second node and the reference voltage, to generate a comparison result; and a logic unit, coupled to the control module and the comparator, for generating the switch signal according to the control signal and the comparison result.

19. The direct current converter of claim 18, wherein the comparator is further coupled to the control module, and is utilized for activating comparison between the voltage of the second node and the reference voltage according to the control signal, to generate the comparison result.

20. The direct current converter of claim 18, wherein the logic unit comprises a delay unit, for preventing noises of the switching signal from affecting the switch signal.

21. The direct current converter of claim 20, wherein the delay unit is utilized for generating a delay signal with a blanking time absolutely greater than a period of the control signal, to determine whether the direct current regularly operates.

22. The direct current converter of claim 18, wherein the logic unit further comprises a counter, for counting times that a fault value appears in the comparison result.

* * * * *